Nov. 17, 1936. L. W. G. FLYNT 2,060,858
METHOD OF MAKING TIE RODS AND BLANK THEREFOR
Filed Oct. 19, 1933  2 Sheets-Sheet 1.
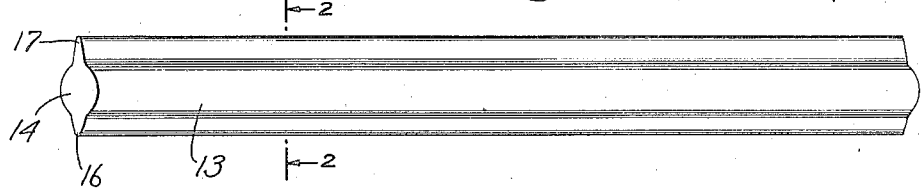
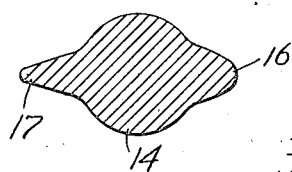 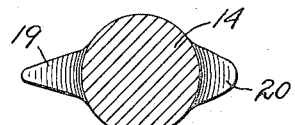
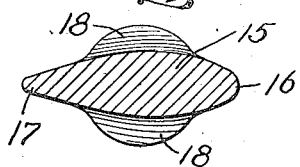
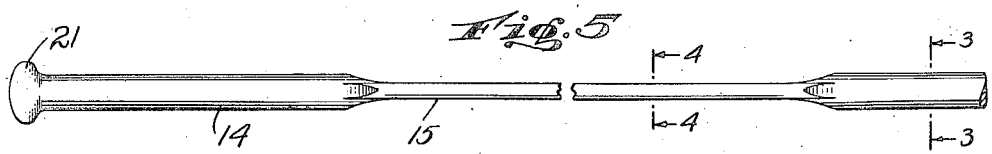
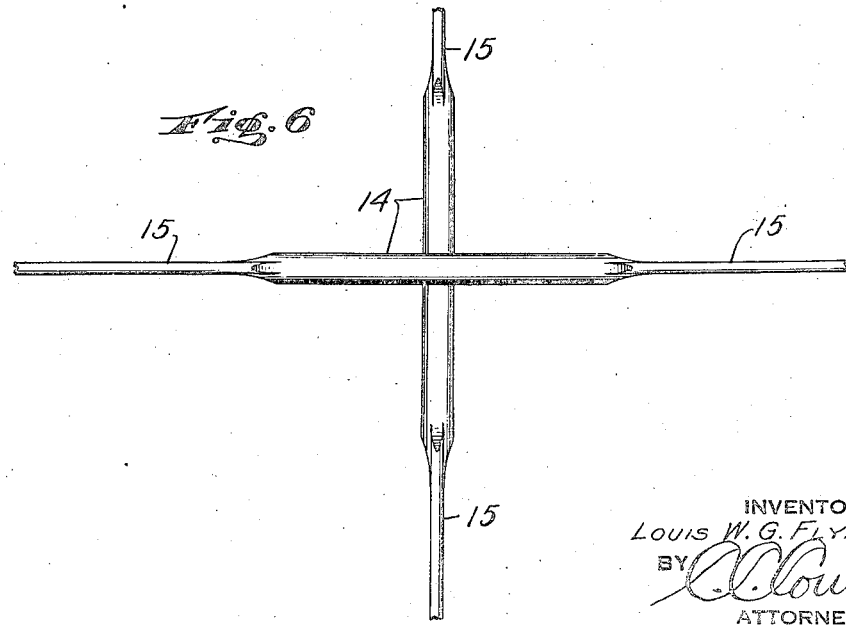
INVENTOR
LOUIS W. G. FLYNT.
BY
ATTORNEY

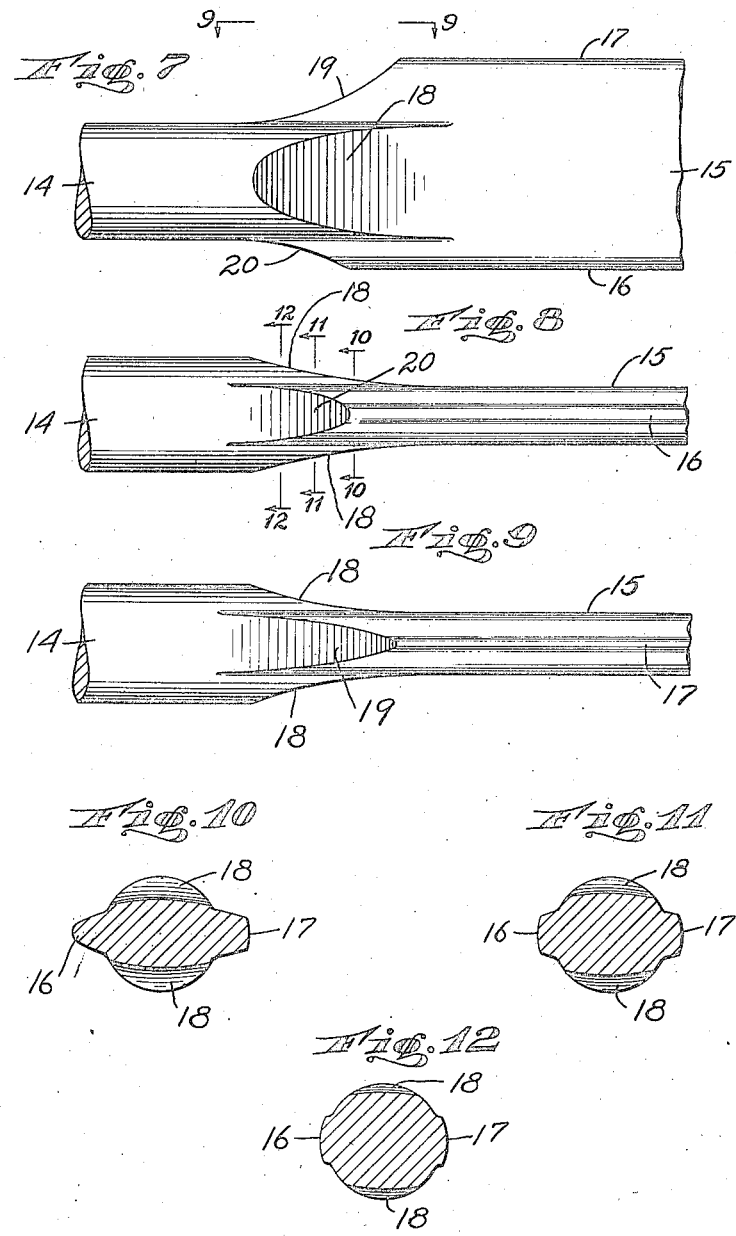

Patented Nov. 17, 1936

2,060,858

UNITED STATES PATENT OFFICE 2,060,858

METHOD OF MAKING TIE RODS AND BLANK THEREFOR

Louis W. G. Flynt, East Orange, N. J., assignor to Breeze Corporations, Inc., Newark, N. J.

Application October 19, 1933, Serial No. 694,276

15 Claims. (Cl. 29—148)

This invention relates to wire or rods of true aerfoil section and the method of producing the same. By "true aerfoil" is meant a shape having a curved, relatively blunt forward edge and a relatively long trailing edge as distinguished from shapes known generically or loosely as "streamlined", which shapes may be oval, lenticular or other shapes including aerfoil. While the invention herein is describd in connection with aerfoil rods, it may be used to produce a rod of any desired cross-section.

The words "tie rods" as used herein denote generally all rods, wires, braces, struts, guy wires, etc. whether used under tension, compression or otherwise.

This invention is applicable to many arts where tie rods are used. It is particularly adapted for use under conditions where it is desired to decrease the air resistance offered by tie rods. For the purposes of this disclosure the invention is described in connection with its use on aircraft.

In aircraft practice, where tie rods are exposed to the air stream, a considerable resistance is set up. This resistance can be materially decreased and the efficiency of the aircraft considerably increased by making all exposed tie rods of true aerfoil section.

Therefore, the broad object of this invention is to provide an aerfoil wire or rod suitable for use as a tie rod. It has been found that it is impractical to use a wire or rod having an aerfoil form throughout its length. Therefore, a further object of this invention is to produce a wire or rod of a true aerfoil shape having terminal extensions of a different shape for engagement by or with suitable connecting means.

Due to the extreme vibration encountered in aircraft practice the metal will become fatigued and a breakdown may result if there is any point in the length of the tie rod at which the stresses set up by constant vibration may be localized or concentrated. Where there is any variation in the cross-sectional area between the ends of the rod, the stresses will be localized at the point of least cross-sectional or at the point where the area changes and a breakdown may result.

Therefore, a further object of the invention is to provide a rod or wire having a true aerfoil section for a part of its length and a different section for the remainder of its length, but which will have substantially the same cross-sectional area at all points in its length. Furthermore, if the rod or wire is not absolutely straight the stresses will be localized at the point at which the longitudinal axis varies from a straight line, even though such variation be very slight. Therefore, a further object of the invention is to provide a method of producing an aerfoil rod without any bends or curves.

In the past, where streamlined wire of lenticular section or shapes other than true aerfoil have been made, the results have been so lacking in uniformity and the cost of production so high that commercial use has not been practical. Therefore, a further, specific object of the invention is to provide for the commercial manufacture of aerfoil wire by a simple method so that the cost of production can be low enough to warrant widespread use. A further object of the invention is to provide a simple method of production which will insure uniformity in the wires produced.

Where two rods or braces cross one another it is not practical to have the rods of aerfoil section at the point of crossing, because of the relatively large width from edge to edge of the aerfoil rod. Therefore, a further, specific object of the invention is to produce a wire having an aerfoil section, but which will be circular at the point at which it crosses another wire.

The invention consists of the construction, combination, arrangement of parts and the steps of the method as herein illustrated, described and claimed.

In the accompanying drawings, forming part hereof, is illustrated a form of embodiment of the invention, in which drawings similar reference characters designate corresponding parts and in which:

Figure 1 is a perspective view of a section of stock from which the rod is made;

Figure 2 is a section on line 2—2 of Figure 1, looking in the direction indicated by the arrows;

Figure 3 is a section on line 3—3 of Figure 5, looking in the direction indicated by the arrows;

Figure 4 is a section on line 4—4 of Figure 5, looking in the direction indicated by the arrows;

Figure 5 is a plan view, partly broken away, showing the aerfoil shape in the center of the rod and the cylindrical shape on the ends of the rod;

Figure 6 is a detail in plan of two rods crossing one another, the ends of the rods being broken away;

Figure 7 is an enlarged fragmentary detail in side elevation of that portion where the aerfoil merges with the cylindrical section, the trailing edge being on top;

Figure 8 is an enlarged fragmentary detail in bottom plan of the portion shown in Figure 7;

Figure 9 is an enlarged fragmentary detail in plan of the portion shown in Figure 7;

Figure 10 is a vertical section taken approximately on line 10—10 of Figure 8, looking in the direction indicated by the arrows;

Figure 11 is a vertical section taken approximately on line 11—11 of Figure 8, looking in the direction indicated by the arrows; and, Figure 12 is a vertical section taken approximately on line 12—12 of Figure 8, looking in the direction indicated by the arrows.

Referring to the drawings 13 designates a bar of metal which may be rolled or drawn steel. As shown by Figures 2, 3 and 4 the cross-section of the bar 13 is such that it combines both a circular section 14 and an aerfoil section 15. The aerfoil section 15 comprises a portion within the limits of the circular section together with a leading edge 16 and a trailing edge portion 17, both extending beyond the circumference of the circular section 14.

In the manufacture of the wire or rod a section of stock 13 slightly longer than the wire to be produced is engaged by its ends in suitable fixtures and axial tension is imposed thereon. While the bar 13 is held under tension it is heated to a critical temperature which will vary with the metal used. By holding the rod 13 under tension while it is heated, any slight bends or kinks will be removed. The heating may be done in any approved manner, either electrically by resistance or induction, by immersion in a molten bath of a metallic salt or salts or by other method. When the rod has been heated to the desired temperature, and while still held under tension, it is quenched by immersion in oil or other suitable quenching bath.

After the bar 13 has been quenched, and while it is still held under tension, the bar 13 is drawn back in any well known manner to impart the physical properties best suited to the use to which the finished rod will be put.

After the bar 13 has been heat treated and cooled it is removed from the tensioning fixtures. The aerfoil sections 16 and 17 adjacent the ends of the bar 13 are then removed by milling, leaving the ends of the bar 13 of cylindrical shape 14. Since the cutter on the milling machine is circular, a curved portion or run off 19 will be formed between the cylinder 14 and the trailing edge 17 at the point which the milling operation is stopped. On the opposite edge of the stock 13 a similar curved portion or run off 20 will be left between the cylinder 14 and the leading edge 16.

When the end portions of the rod or bar 13 have been made cylindrical a part of these ends are cut off so that the rod will be of the length desired in the finished product. The purpose of initially using a longer piece of stock 13 than necessary for a completed rod is to provide a portion on either end of the stock 13 for engagement by the tensioning means so that all of the stock 13 which will form the finished wire will be uniformly heat treated.

When the cylindrical ends 14 of the stock 13 have been shortened to the desired length, the ends may be upset to form heads 21 for use with a connecting means such as is disclosed in the co-pending application of James H. Steenson, Serial No. 624,321. The ends of the cylindrical portion 14 may also be threaded or otherwise formed for engagement with suitable connecting means.

When the ends of the rod have been formed the center portion thereof is milled to remove the cylindrical portions 14 in excess of the aerfoil section 15. This leaves the intermediate portion of the rod of a true aerfoil section, as shown in Figure 4.

Since a circular cutter is used, there will not be a sudden change from aerfoil to cylinder but instead a curved portion or run off 18 will be left on each side of the rod. The milling operation on the center of the rod is carried far enough so that the curved portion 18 will end at or a little short of the beginning of the curves 19 and 20 on the cylinder 14.

The cross-section of the stock 13 is such that the cross-sectional area of the aerfoil section 15 is equal to the cross-sectional area of the cylinder 14. However, as shown by Figures 7 to 12, on those portions of the rod where the aerfoil section 15 merges with the cylinder 14, the cross-section is neither circular nor aerfoil but is a combination of a portion of each shape. As shown by the progressive sections in Figures 10 to 12, as more of the cylindrical portion 14 is left on the stock 13, more of the aerfoil sections 16 and 17 are removed.

It will be noted that while the curves 19 and 20 are similar to one another, the curve 18 is a different curve. This is accomplished by using different sizes of cutters on the milling machine. For example, a cutter having a one inch radius may be used in removing the sections 16 and 17 to produce the curves 19 and 20 while a cutter having a three inch radius will be used to remove the excess cylindrical portions to produce the curves 18. As a result, on that portion of the rod where the cylindrical merges with the aerfoil shape, the amount of metal in cross-sectional area removed from one shape is balanced by the additional amount of metal in cross-sectional area left on the other shape. Therefore, the cross-sectional area is substantially the same throughout that portion where the two shapes merge. Since the cross-sectional area of the cylindrical portion 14 and the aerfoil portion 15 is the same, and since on the merging of the two shapes the cross-sectional area removed from one shape is balanced by the additional cross-sectional area left on the other shape, the cross-sectional area of the finished rod will be substantially the same at all points in its length.

Where the curved portion 18 meets the cylinder 14 a relatively abrupt edge is left. These edges also occur where the curve 19 meets the edge 17 and where the curve 20 meets the edge 16. These relatively abrupt edges may be rounded off by hand filing or by suitable machining.

Where two rods or wires cross one another it is not practical to have them of aerfoil formation at the point of crossing by reason of the greater width of the aerfoil form. This can be readily seen by a comparison of the distance between the edges 16 and 17 as shown in Figure 7 with the diameter of the cylinder 14 in Figure 7. In Figure 6 is illustrated the provision made for two wires that cross one another. At and adjacent the point of crossing the full cylindrical portion 14 is left on the stock 13 and the aerfoil portions 16 and 17 are removed. In this way the two wires are permitted to lie closer together than would be possible if both were of aerfoil section.

The method of making such wires is the same as heretofore described, except that in addition to forming the ends of the wire into a circular section, a portion intermediate of the ends of the wire is also formed with a circular section, and the remainder of the wire is formed of the .erfoil section.

After the rod has been completely milled and the ends formed for engagement with a connecting means, a smooth finish may be given by use of suitable polishing and buffing wheels. In order to prevent corrosion of the metal in service, the rod may be finished by plating with cadmium or other corrosion resisting metal.

In the following claims only the method and blank are defined, the tie rod itself being covered in a divisional application Serial No. 734,809, filed July 12, 1934.

Having thus fully described the invention, what is claimed as new and desired to be secured by Letters Patent is:

1. The herein described method of making a tie rod, which consists of forming a body of metal of circular contour having streamline ribs at opposite sides and reducing the ends to circular shape and the intermediate portion to streamline shape, leaving the rod of approximately uniform cross-sectional area from end to end and polishing and plating the body to reduce corrosion and wear.

2. The herein described method of making a tie rod which consists in forming a body of metal of circular contour and having streamline ribs at opposite sides of a length slightly longer than is intended for use, reducing the ends to circular and the intermediate portion to streamline cross-sections, heat-treating the body under tension and removing the excess length at the ends of the body.

3. The herein described method of making a tie rod which consists in forming a body of metal of circular contour and having streamline ribs at opposite sides, reducing the ends to circular and the intermediate portion to streamline cross-sections, heat-treating the body under tension and forming the ends for engagement with a connecting means and finishing the rod to present no abrupt lines and to resist wear and corrosion.

4. The method of making tie rods having a uniform cross-sectional area which consists in forming a blank which incorporates both a streamline and a circular cross-section, removing the streamline portions in excess of the circular section adjacent the ends of the blank and finally removing the circular portions in excess of the streamline sections intermediate of the end portions.

5. The method of making tie rods having a uniform cross-sectional area which consists in forming a blank which incorporates both a streamline and a circular cross-section, heat-treating the blank under tension, removing the streamline portions in excess of the circular section adjacent the ends of the blank and finally removing the circular portions in excess of the streamline sections intermediate of the end portions.

6. The method of making tie rods having a uniform cross-sectional area which consists in forming a blank which incorporates both a streamline and a circular cross-section, machining the blank to remove the streamline portions in excess of the circular section adjacent the ends of the blank and finally machining the blank to remove the circular portions in excess of the streamline sections intermediate of the end portions.

7. The method of making tie rods having a uniform cross-sectional area which consists in forming a blank which incorporates both a streamline and a circular cross-section, heat-treating the blank under tension, machining the blank to remove the streamline portions in excess of the circular section adjacent the ends of the blank and finally machining the blank to remove the circular portions in excess of the streamline sections intermediate of the end portions.

8. The method of making tie rods having a uniform cross-sectional area which consists in forming a blank which incorporates both a streamline and a circular cross-section, machining the blank to remove the streamline portions in excess of the circular section adjacent the ends of the blank and finally machining the blank to remove the circular portions in excess of the streamline sections intermediate of the end portions, the last operation being extended sufficiently far to form a gradual merging of the streamline and circular shapes.

9. The method of making tie rods having a uniform cross-sectional area which consists in forming a blank which incorporates both a streamline and a circular cross-section, milling the blank to remove the streamline portions in excess of the circular portions at various places longitudinally of the blank and finally milling the blank to remove the circular portions in excess of the streamline portions intermediate of the milled circular portions.

10. As a new article of manufacture, a blank which incorporates both a circular and a streamline cross-section and in which the bases of the streamline sections contiguous to the circular section have a dimension less than the diameter of the circular section.

11. As a new article of manufacture, a blank having a circular cross-section and provided on opposite sides with complementary projecting ribs, the thickness of the ribs at the junction with the circular section being less than the diameter of the circular section.

12. The method of making a tie rod having some portions of streamlined contour and other portions of cylindrical contour wherein the cross-sectional area of the streamlined portions is the same as the cross-sectional area of the cylindrical portions which consists in forming a blank which incorporates both streamline and circular cross-section, reducing some portions of the blank to cylindrical shape and reducing other portions of the blank to a streamline shape having a cross-sectional area equal to the cross-sectional area of the cylindrical shape.

13. The method of making a tie rod having some portions of streamlined contour and other portions of cylindrical contour wherein the cross-sectional area of the streamlined portions is the same as the cross-sectional area of the cylindrical portions which consists in forming a blank which incorporates both streamline and circular cross-section, reducing the ends of the blank to cylindrical shape and reducing the portion intermediate of the cylindrical end portions to a streamline shape having a cross-sectional area equal to the cross-sectional area of the cylindrical shape.

14. The method of making a tie rod having some portions of a streamlined contour and other portions of cylindrical contour wherein the cross-sectional area of the streamlined portions is the same as the cross-sectional area of the cylindrical portions which consists in forming a blank which incorporates both streamline and circular cross-section, heat treating the blank under tension to straighten the same, reducing the ends of the blank to cylindrical shape and reducing the portion intermediate of the cylindrical end portions to streamline shape.

15. As a new article of manufacture, a one piece blank from which a tie rod may be formed, said blank having a cross-sectional shape which includes both a streamline and a circular shape and in which there is an area common to both shapes and additional areas to complete either shape and in which the cross-sectional area of the streamline shape without the circular portions is equal to the cross-sectional area of the circular shape without the streamline portions.

LOUIS W. G. FLYNT.